Jan. 26, 1954
B. SIGNORI
2,667,374
ARTICULATED SHOCK FENDER
Filed Feb. 16, 1948
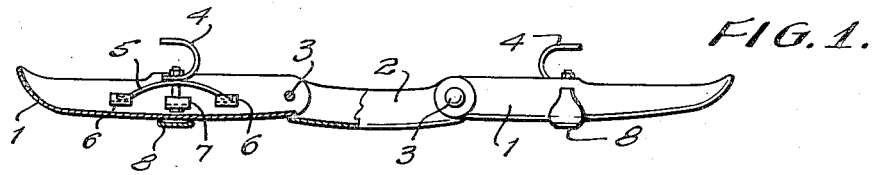
FIG. 1.
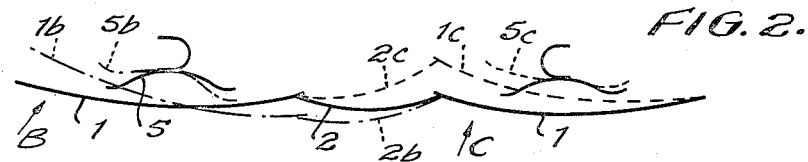
FIG. 2.
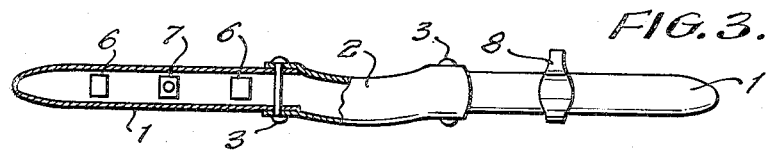
FIG. 3.
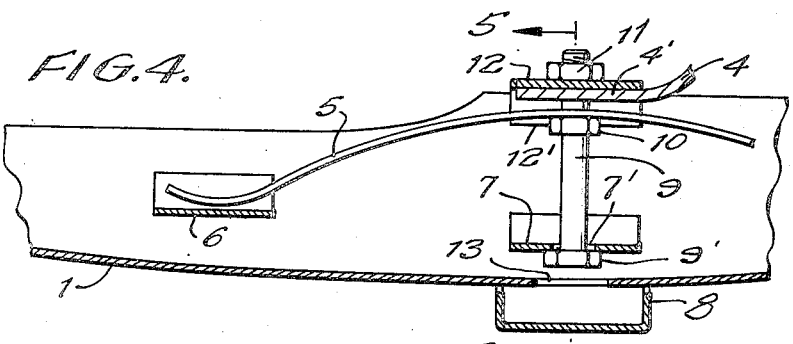
FIG. 4.
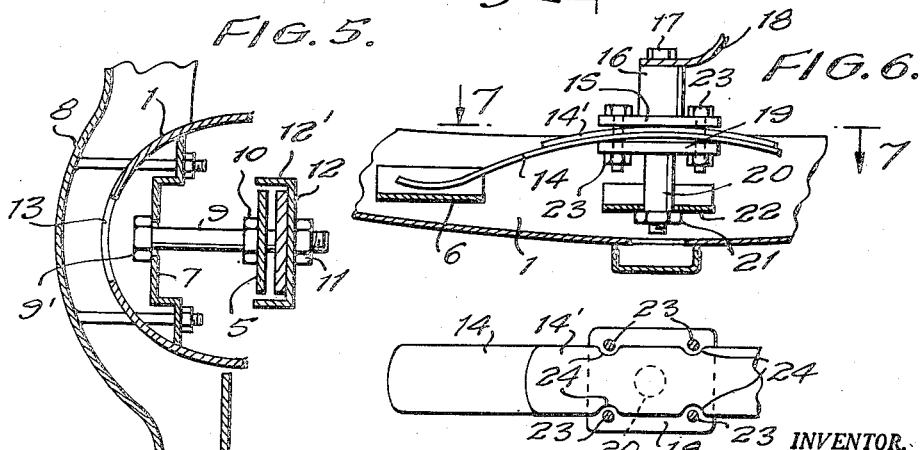
FIG. 5.
FIG. 6.
FIG. 7.
INVENTOR.
Bruno Signori
BY Michael S. Striker Patented Jan. 26, 1954

2,667,374

UNITED STATES PATENT OFFICE 2,667,374

ARTICULATED SHOCK FENDER

Bruno Signori, Udine, Italy

Application February 16, 1948, Serial No. 8,652

6 Claims. (Cl. 293—70)

The present invention relates to a new and useful improvement of articulated shock bumpers for vehicles and it is its object to provide a resilient and strong bumper which is adapted to absorb shocks from any direction.

A preferred embodiment of the present invention consists of two side bumpers disposed on either side of the vehicle and attached independently from each other to the frame of the vehicle. Between these two bumpers and connected to them by joints, a central bumper member is arranged which is in no way connected to and directly supported by the frame of the vehicle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a top view of the shock fender, partly in section;

Fig. 2 is a schematic drawing illustrating examples of elastic deformations of my new bumper caused by shocks;

Fig. 3 is a front view of the bumper shown in Fig. 1, partly in section;

Fig. 4 is a sectional view of one supporting part of the bumper;

Fig. 5 is a vertical section along line 5—5 of Fig. 4;

Fig. 6 is a sectional view of another embodiment of a supporting means according to my invention; and Fig. 7 is a sectional view of the embodiment shown in Fig. 6 along line 7—7.

The shock bumper according to the embodiment shown in Figs. 1, 2 and 3 comprises two side bumpers 1, which are supported on supporting members 4 on the frame of the vehicle by means of bolts 9 (Figs. 4 and 5) which are slidable through guiding holes 7' in brackets 7. Brackets 7 are secured to the bumpers 1.

On the bolt 9 nuts 10 and 11 are disposed by which a leaf spring 5 is pressed to the flattened portion 4' of the supporting bracket 4. Leaf spring 5 urges the bumper 1 away from the frame of the vehicle, while the head 9' of bolt 9 limits the movement of bumper 1 by abutting on bracket 7. The bolts 9 with heads 9' and nuts 11 constitute together with the brackets 7 attaching means for the side bumpers 1.

A U-shaped member 12 secures spring 5 by means of its bent side portions 12' against turning (Fig. 5).

The ends of leaf spring 5 are mounted slidably along guides 6 secured to bumper 1 (Fig. 4). The two side bumpers 1 are connected by pivot joints 3 with a central bumper member 2 (Figs. 1 and 3). If the bumper is deformed by shock, the bolt 9, which is sliding in the guiding hole 7' of bracket 7, will pass through hole 13 in the bumper 1 (Fig. 5). The same holes 13 are used for assembling, and are covered by covers 8.

In an embodiment of my invention suitable for heavy vehicles shown in Figs. 6 and 7, the spring 14 is constructed of two or more leaf springs 14' which are clamped between the rectangular flanges 15 and 19 of the cylindrical members 16 and 20 by means of bolts and nuts 23 passing through semicircular cutouts 24 in the edge of spring 14, thereby securing it against turning.

A bolt 17 secures the cylindrical member 16 to the bracket 18 disposed on the frame of the vehicle. Nut 21 abutting on bracket 22 on the bumper 1 limits the movement of the bumper under the action of spring 14.

Fig. 2 shows the elastic deformation of the articulated shock bumper according to the present invention. In the event of an impact coming from the direction shown by arrow B, the side bumper 1 will be deformed into position 1b and the spring 5 into position 5b whereby the shock is completely absorbed.

In the event of an impact in the direction shown by arrow C, the other side bumper 1 will be deformed into the position 1c and the corresponding spring 5 into position 5c. The center part 2 will follow the movements of the side bumper, and serves the purpose of protecting the vehicle against frontal shocks by distributing the force of the impact to the two side bumpers 1.

It will be understood that each of the elements described above, or two or more together, may also find a useful application in other types of shock fenders differing from the types described above.

While I have illustrated and described the invention as embodied in an articulated shock fender for vehicles, I do not intend to be limited to the details shown, since various modifications and structural changes may be made without departing in any way from the spirit of my invention.

Without further analysis, the foregoing will so fully reveal the gist of my invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. An automobile bumper comprising in combination, an elongated central bumper member; two elongated side bumper members, each pivoted at one end to one end of said elongated central bumper member; two supporting members, each adapted to be secured to the body of the automobile; two attaching means, each securing one of said elongated side bumper members between the ends thereof to one of said supporting members slidably normal to the longitudinal axis of the respective side bumper member towards and away from the respective supporting member; and two spring means each arranged between one of said supporting members and the corresponding elongated side bumper member resiliently forcing said side bumper member away from the corresponding supporting member.

2. An automobile bumper comprising in combination, an elongated central bumper member; two elongated side bumper members, each pivoted at one end to one end of said elongated central bumper members; two supporting members, each adapted to be secured to the body of the automobile; two attaching means, each securing one of said elongated side bumper members between the ends thereof to one of said supporting members slidably normal to the longitudinal axis of the respective side bumper member towards and away from the respective supporting member; and two leaf springs each secured at its center to one of said supporting members and pressing with its free end portions against the corresponding elongated side bumper member freely slidably in longitudinal direction of said side bumper member and forcing the same in a direction away from said supporting member.

3. An automobile bumper comprising in combination, an elongated central bumper member; two elongated side bumper members, each pivoted at one end to one end of said elongated central bumper member; two supporting members, each adapted to be secured to the body of the automobile; two holding members each secured to one of said elongated side bumper members substantially in the middle of the same; two attaching means each secured to one of said supporting members and slidably supporting one of said holding members so that each of said side bumper members is slidable towards and away from the corresponding supporting member; and two spring means each arranged between one of said supporting members and the corresponding elongated side bumper member resiliently forcing the same away from the corresponding supporting member.

4. An automobile bumper comprising in combination, an elongated central bumper member; two elongated side bumper members, each pivoted at one end to one end of said elongated central bumper member; two supporting members, each adapted to be secured to the body of the automobile; two holding members each secured to one of said elongated side bumper members substantially in the middle of the same; two attaching means each secured to one of said supporting members and slidably supporting one of said holding members so that each of said side bumper members is slidable towards and away from the corresponding supporting member; and two leaf springs each secured at its center to one of said supporting means and pressing with its free end portions against the corresponding elongated side bumper member, said free end portions being freely slidable in longitudinal direction of said side bumper member and forcing the same in a direction away from said supporting member.

5. An automobile bumper comprising in combination, an elongated central bumper member; two elongated side bumper members; pivoting means pivotally securing said elongated side bumper members to the ends of said elongated central bumper member; two supporting members each adapted to be secured to the body of the automobile; two forwardly projecting rod members each firmly secured to one of said supporting members; two attaching means each slidably attaching one of said elongated side bumper members to one of said forwardly projecting rod members movably towards and away from the corresponding supporting member; stop means on each of said forwardly projecting rod members preventing sliding off of said attaching means of said elongated side bumper members from said forwardly projecting rod members; and two spring means each arranged between one of said supporting members and the corresponding elongated side bumper member, and resiliently forcing said side bumper members away from the corresponding supporting member.

6. An automobile bumper comprising in combination, an elongated central bumper member; two elongated side bumper members; pivoting means pivotally securing said elongated side bumper members to the ends of said elongated central bumper member; two supporting members each adapted to be secured to the body of the automobile; two forwardly projecting rod members each firmly secured to one of said supporting members; two attaching means each slidably attaching one of said elongated side bumper members to one of said forwardly projecting rod members movably towards and away from the corresponding supporting member; stop means on each of said forwardly projecting rod members preventing sliding off of said attaching means of said elongated side bumper members from said forwardly projecting rod members; and two leaf spring means each secured at its center to one of said supporting members and pressing with its free end portions against the corresponding elongated side bumper member, said end portions being freely slidable in longitudinal direction of said side bumper member and forcing the same in a direction away from said supporting member.

BRUNO SIGNORI.

References Cited in the file of this patent

UNITED STATES PATENTS

| Number | Name | Date |
|---|---|---|
| 1,424,699 | Wernig | Aug. 1, 1922 |
| 1,564,279 | Ross | Dec. 8, 1925 |
| 1,623,413 | Jandus et al. | Apr. 5, 1927 |
| 1,668,811 | Jones | May 8, 1928 |
| 1,686,829 | Malling | Oct. 9, 1928 |
| 1,855,977 | Llobet | Apr. 26, 1932 |
| 1,978,179 | Weiland | Oct. 23, 1934 |
| 2,306,994 | Martin | Dec. 29, 1942 |